US009832328B2

United States Patent
Nakane et al.

(10) Patent No.: US 9,832,328 B2
(45) Date of Patent: Nov. 28, 2017

(54) CHARACTER RECOGNITION APPARATUS AND CHARACTER RECOGNITION METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Naomi Nakane, Kanagawa (JP); Setsuo Takada, Shizuoka (JP); Noboru Furuyama, Kanagawa (JP); Yoshiaki Okano, Shizuoka (JP); Masaya Tanaka, Shizuoka (JP); Hiroshi Katakura, Shizuoka (JP); Chie Miyauchi, Kanagawa (JP); Katsutoshi Mita, Shizuoka (JP); Hiroshi Ishii, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/953,704

(22) Filed: Nov. 30, 2015

(65) Prior Publication Data

US 2017/0155778 A1 Jun. 1, 2017

(51) Int. Cl.
*G06K 15/02* (2006.01)
*G06K 9/00* (2006.01)
*H04N 1/00* (2006.01)
*H04N 1/40* (2006.01)

(52) U.S. Cl.
CPC ..... *H04N 1/00331* (2013.01); *H04N 1/40012* (2013.01); *H04N 2201/0094* (2013.01)

(58) Field of Classification Search
CPC ........... H04N 1/00331; H04N 1/40012; H04N 2201/0094; B41M 7/00; B41M 7/009; B41M 430/19; B41M 5/305; B41M 2205/18
USPC ........ 382/163, 172; 358/1.9, 1.11–1.18, 538, 358/2.1; 347/179; 399/43, 45
See application file for complete search history.

(56) References Cited

U.S. PATENT DOCUMENTS

| | | | |
|---|---|---|---|
| 7,020,328 B2 | 3/2006 | Barton | |
| 9,098,783 B1* | 8/2015 | Saito | G06T 7/408 |
| 2008/0069447 A1* | 3/2008 | Hotta | G06K 9/346 |
| | | | 382/182 |
| 2011/0199625 A1* | 8/2011 | Sugimoto | H04N 1/00867 |
| | | | 358/1.9 |
| 2011/0205601 A1* | 8/2011 | Akimoto | G03G 21/046 |
| | | | 358/475 |

(Continued)

*Primary Examiner* — Chad Dickerson
(74) *Attorney, Agent, or Firm* — Amin, Turocy & Watson LLP

(57) ABSTRACT

In accordance with an embodiment, a character recognition apparatus comprises a decolorization control section configured to carry out a decolorization processing for a sheet; an image reading control section configured to carry out an image reading processing for the sheet to which the decolorization processing is carried out; and a character recognition processing section configured to carry out a character recognition processing for a decolorized image read through the reading processing after the decolorization processing is carried out or for a generated image generated according to the decolorized image.

10 Claims, 18 Drawing Sheets

(56) References Cited

U.S. PATENT DOCUMENTS

| | | | | |
|---|---|---|---|---|
| 2012/0038941 A1* | 2/2012 | Megawa | ............ | G03G 15/6585 358/1.13 |
| 2013/0016376 A1* | 1/2013 | Hashidume | .......... | G03G 9/0926 358/1.9 |
| 2013/0070265 A1* | 3/2013 | Megawa | .................. | H04N 1/40 358/1.9 |
| 2013/0242026 A1* | 9/2013 | Mizutani | .............. | B41M 7/0009 347/179 |
| 2013/0293931 A1* | 11/2013 | Yasunaga | ........... | H04N 1/00037 358/3.28 |

\* cited by examiner

FIG.3

Calculation test

Name : *ABCD*

Calculation test

Name : ~~A B C D~~

Calculation test

Name : *A B C D*

Calculation test

Name : _____

1 : 123 X 10 =

2 : 130 / 10 =

3 : 12 + 5 =

4 : 144 / 12 =

CHARACTER RECOGNITION APPARATUS AND CHARACTER RECOGNITION METHOD

FIELD

Embodiments described herein relate to a character recognition apparatus and a character recognition method.

BACKGROUND

A character recognition technology such as an OCR (Optical Character Recognition) is known. The character recognition technology refers to a technology of converting the characters recorded in image data as imaged data into character codes (text data).

In many cases, in addition to the images of the characters to be recognized, image other than the characters of the recognition object is also included in image data. For example, apart from the characters (e.g. amount and commodity name) desired to be recognized, even ruled lines and a background color are also included in a business form. Moreover, besides answer characters, even a problem statement in which text data is considered to already exist is also included in a test paper.

The accuracy of character recognition is lowered if a great number of images needing no character recognition are included in image data.

BRIEF DESCRIPTION OF THE DRAWINGS

FIG. 3 exemplifies a non-decolorized image;

FIG. 5 exemplifies a decolorized image;

FIG. 7 exemplifies a synthesized image;

FIG. 12 exemplifies a non-decolorized image;

FIG. 18 exemplifies a decolorized image.

DETAILED DESCRIPTION

In accordance with an embodiment, a character recognition apparatus comprises a decolorization control section configured to carry out a decolorization processing for a sheet; an image reading control section configured to carry out an image reading processing for the sheet to which the decolorization processing is executed; and a character recognition processing section configured to carry out a character recognition processing for a decolorized image read through the reading processing after the decolorization processing is carried out or for a generated image generated according to the decolorized image.

Embodiments of the present invention are described below with reference to accompanying drawings in which identical or equivalent components are denoted by identical reference signs.

Embodiment 1

Figure 1:
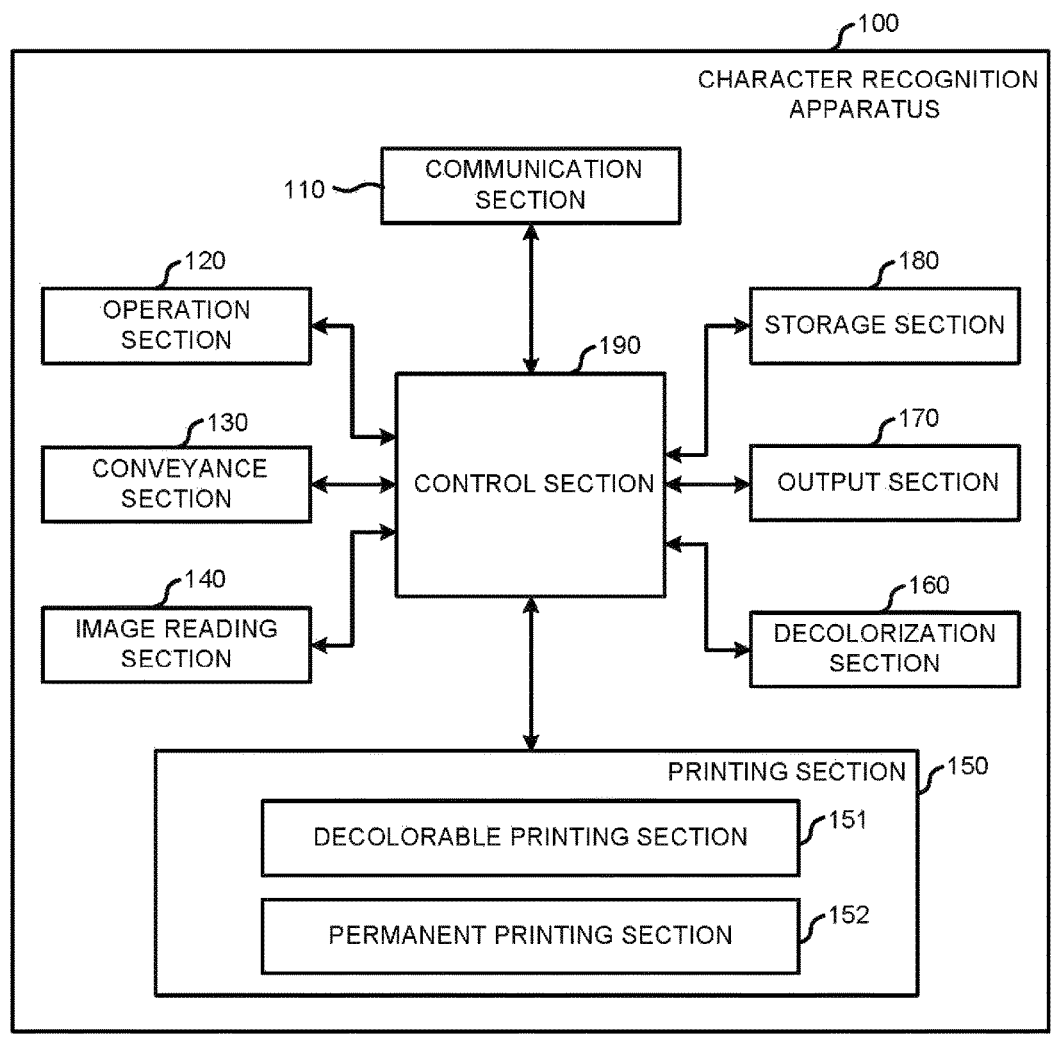
FIG. 1 is a block diagram illustrating a character recognition apparatus according to embodiment 1.

In accordance with an embodiment, a character recognition apparatus 100 is an apparatus for converting the characters recorded on a sheet as image data into text data. The character recognition apparatus 100 is, for example, an MFP (Multifunction Peripheral) having an OCR function. FIG. 1 is a block diagram illustrating the character recognition apparatus 100. The character recognition apparatus 100 comprises a communication section 110, an operation section 120, a conveyance section 130, an image reading section 140, a printing section 150, a decolorization section 160, an output section 170, a storage section 180 and a control section 190.

The communication section 110 is a communication interface for connecting an external device with the character recognition apparatus 100. The communication section 110 functions as an input section for receiving a command from the user. The external device is, for example, a user terminal such as a personal computer. If a command such as an OCR start command is received from the user terminal, the communication section 110 notifies the control section 190 of the received command.

The operation section 120 is a user interface such as a button, a switch and a touch panel. The operation section 120 functions as an input section for receiving a command from the user. If a command such as an OCR start command is received from the user, the operation section 120 notifies the control section 190 of the received command.

The conveyance section 130 is a device for conveying a sheet to each section of the character recognition apparatus 100. For example, the conveyance section 130 consists of a conveyance roller and a motor for driving the conveyance roller. The conveyance section 130 conveys, under the control of the control section 190, a sheet placed by the user on a paper feed tray to the image reading section 140, the printing section 150 and the decolorization section 160. Further, the conveyance section 130 discharges the sheet processed by the image reading section 140, the printing section 150 and the decolorization section 160 to a paper discharge tray.

The conveyance section 130 is capable of conveying a sheet the image on which is read by the image reading section 140 to the printing section 150 and a sheet printed by the printing section 150 to the image reading section 140. Further, the conveyance section 130 is capable of conveying a sheet the image on which is read by the image reading section 140 to the decolorization section 160 and a sheet decolorized by the decolorization section 160 to the image reading section 140. Moreover, the conveyance section 130 is capable of conveying a sheet printed by the printing section 150 to the colonization section 160 and a sheet decolorized by the decolorization section 160 to the printing section 150.

The image reading section 140 is a device for reading an image from a sheet. The image reading section 140 is, for example, an image capturing device such as an image scanner or a camera. The image reading section 140 reads an image from a sheet under the control of the control section 190.

The printing section 150 is a printing device for printing on a sheet. The printing section 150 comprises a decolorable printing section 151 and a permanent printing section 152.

The decolorable printing section 151 is a device for forming an image on a sheet with a decolorable ink. The decolorable ink refers to an ink which can be erased through a decolorization processing. The decolorable ink is, for example, an ink which can be thermally erased by being heated to a temperature more than a predetermined temperature (hereinafter referred to as a "decolorization temperature"). Further, in addition to liquid ink, the decolorable ink further includes powdery ink. Powdery decolorable ink can also be called decolorable toner. The print with a decolorable ink is hereinafter referred to as a decolorable printing.

The decolorable printing section 151 is, for example, an electrophotographic type printing device. The decolorable printing section 151 comprises an image carrier such as a photoconductive drum, a transfer section for transferring a toner image developed on the image carrier onto a sheet and a fixing section for fixing the toner image transferred onto the sheet on the sheet by means of heat and pressure. The fixing section consists of, for example, a heat roller and a press roller.

The permanent printing section 152 is a device for forming an image on a sheet with a permanent ink. The permanent ink refers to an ink which cannot be erased (that is, an ordinary ink) even if a decolorization processing is performed on it. Further, in addition to liquid ink, the permanent ink further includes powdery ink. Powdery permanent ink is also called permanent toner. The printing with a permanent ink is hereinafter referred to as a permanent printing.

The permanent printing section 152 is, for example, an electrophotographic printing device. Like the decolorable printing section 151, the permanent printing section 152 comprises an image carrier, a transfer section and a fixing section. The decolorable printing section 151 and the permanent printing section 152 may be partially shared. For example, the decolorable printing section 151 and the permanent printing section 152 may share an image carrier, a transfer section and a fixing section.

Further, after completing a decolorable printing job, the printing section 150 can sequentially carry out a permanent printing job on the same sheet. Moreover, after completing a permanent printing job, the printing section 150 can sequentially carry out a decolorable printing job on the same sheet. The decolorable printing and the permanent printing can be carried out on the same surface or different surfaces. An image which can be erased through a decolorization processing is hereinafter referred to as a decolorable image and an image which cannot be erased through a decolorization processing as a non-decolorable image.

The decolorization section 160 is a device for erasing a decolorable image from a sheet. For example, the decolorization section 160 which comprises a heat roller for heating a sheet to a decolorization temperature and a press roller for applying pressure to a sheet erases a decolorable image from a sheet by heating the sheet using the heat roller. Further, in a case where the printing section 150 is an electrophotographic type printing unit, the fixing section of the printing section 150 may have the function of the decolorization section 160. That is, the fixing section of the printing section 150 and the decolorization section 160 may be integrated as a common mechanism.

The output section 170 is a device for outputting various kinds of information for the user. The output section 170 is, for example, a display device such as a Liquid Crystal Display and an Organic Electroluminescence Display or a sound generating device such as a loudspeaker and a buzzer.

The storage section 180 is a storage device capable of data read/write, such as a DRAM (Dynamic Random Access Memory), a SRAM (Static Random Access Memory), a flash memory and a hard disk. The storage section 180 stores various data used by the control section 190. For example, the characteristic data of the characters used by the control section 190 in OCR and the image data read by the image reading section 140 are stored in the storage section 180.

The control section 190 is a processing device such as a processor. The control section 190 functions as a control device for controlling the character recognition apparatus 100. The control section 190 operates according to a program stored in a ROM (Read Only Memory) or a RAM (Random Access Memory) to realize various operations including a character recognition processing described later.

Figure 2:
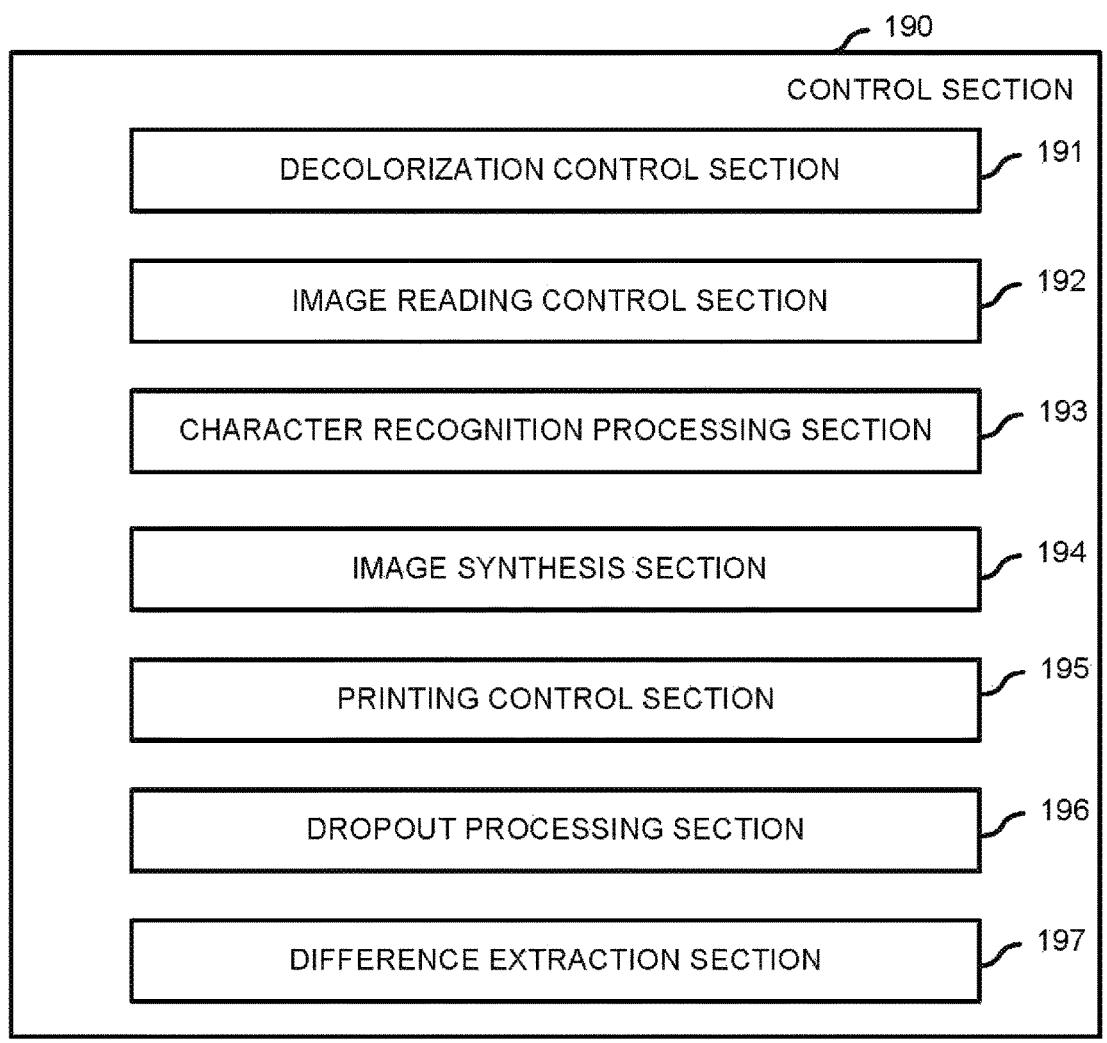
FIG. 2 is a functional block diagram illustrating a control section.

FIG. 2 is a functional block diagram illustrating the control section 190. The control section 190 operations according to the foregoing program to function as a decolorization control section 191, an image reading control section 192, a character recognition processing section 193, an image synthesis section 194 and a printing control section 195. The operations carried out by these sections will be described in the under-mentioned character recognition processing.

The operations of the character recognition apparatus 100 with the foregoing structure are described below.

If an OCR start command is received from the user, then the control section 190 starts a character recognition processing.

Further, it is assumed hereinafter that a sheet for which a character recognition processing needs to be carried out is a sheet having a decolorable image and a non-decolorable image on the same surface thereof. The decolorable image, for example, is an image formed with a decolorable ink, and the non-decolorable image, for example, is an image formed with a permanent ink or using a pencil.

FIG. 3 exemplifies a sheet for which a character recognition processing needs to be carried out. FIG. 3 is a diagram illustrating a test paper on which problem statements are printed with a decolorable ink and answers are written by a student with a ball-point pen or pencil. On the test paper, italic parts ('ABCD', '1230', '10', '17', '13') are non-decolorable parts while the other part (hereinafter referred to as a preprinted part) is a decolorable part.

Figure 4:
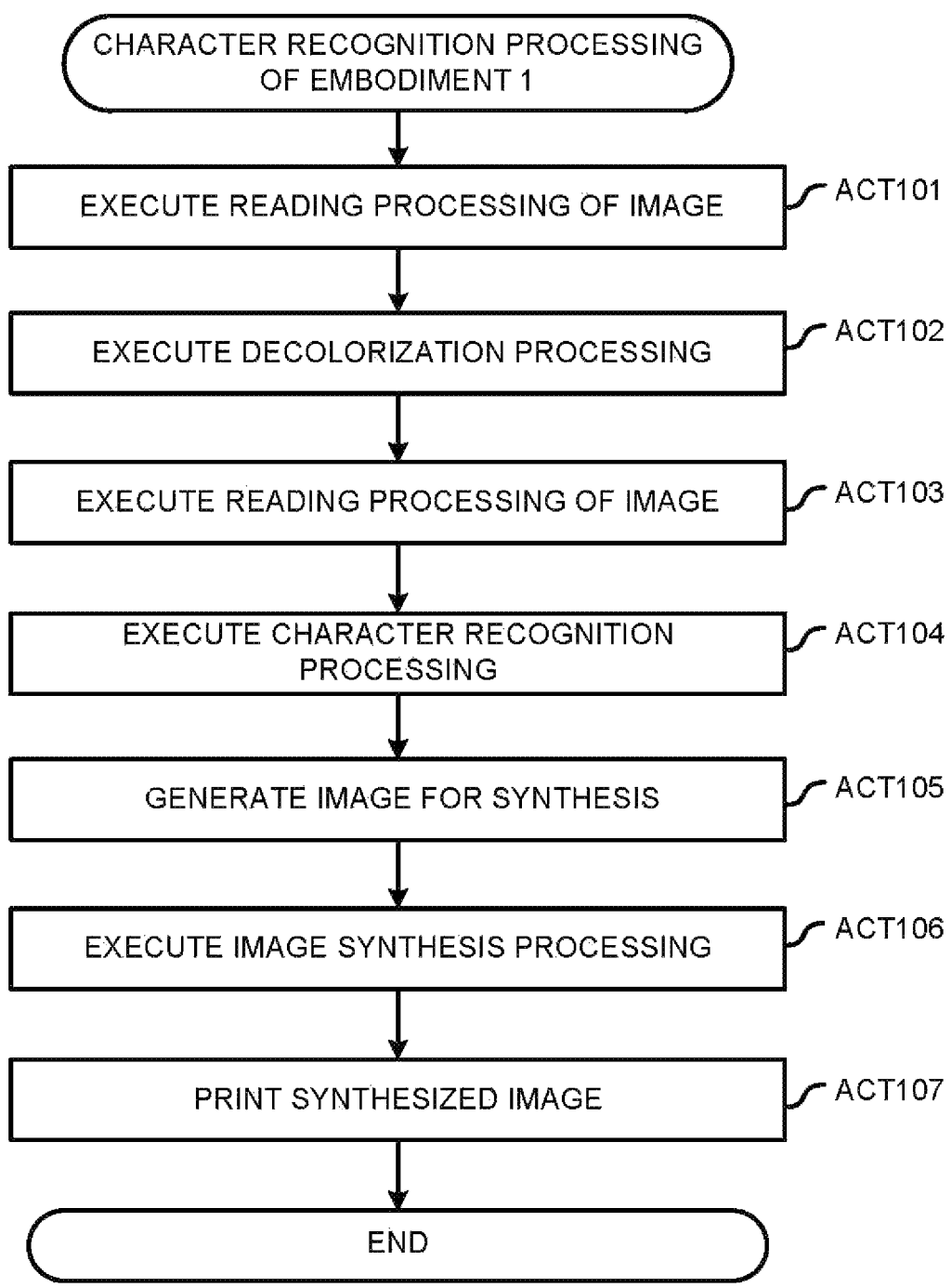
FIG. 4 is a flowchart illustrating a character recognition processing according to embodiment 1.

The character recognition processing is described below with reference to the flowchart of FIG. 4.

The image reading control section 192 controls the conveyance section 130 to convey a sheet to the image reading section 140. Sequentially, the image reading control section 192 controls the image reading section 140 to read an image from the sheet (Act 101). Additionally, the image read by the image reading control section 192 prior to the execution of a decolorization processing is hereinafter referred to as an 'non-decolorized image'. FIG. 3 exemplifies the non-decolorized image acquired in Act 101.

Then, the decolorization control section 191 controls the conveyance section 130 to convey the sheet to the decolorization section 160. Sequentially, the decolorization control section 191 controls the decolorization section 160 to carry out a decolorization processing on the sheet (Act 102).

Figure 5:
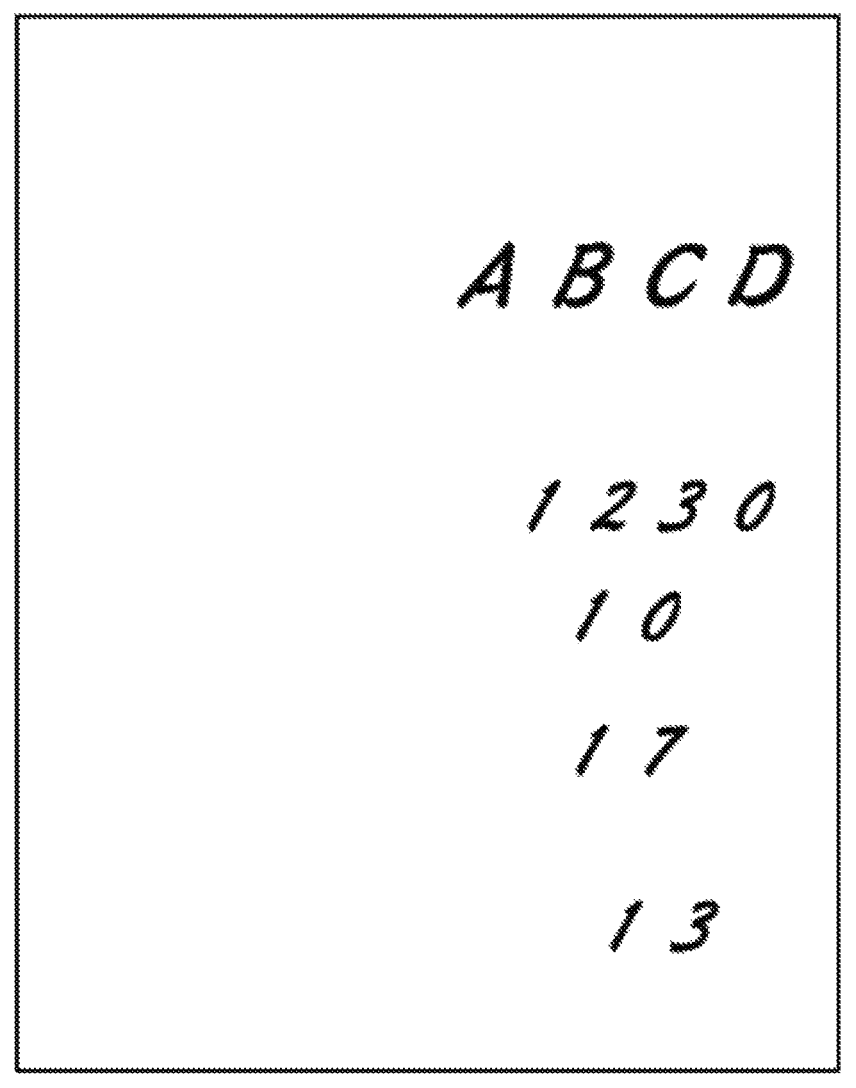

Thereafter, the image reading control section 192 conveys the sheet from the decolorization section 160 to the image reading section 140. Sequentially, the image reading control section 192 controls the image reading section 140 to read an image from the sheet (Act 103). The image read by the image reading control section 192 after a decolorization processing is carried out is hereinafter referred to as a 'decolorized image'. FIG. 5 exemplifies the decolorized image acquired in Act 103. In FIG. 5, the name part and the answer parts are left but not decolorized.

Return to FIG. 4. The character recognition processing section 193 carries out a character recognition processing for the decolorized image. The character recognition processing section 193 stores the recognized characters (text data) in the storage section 180 (Act 104). The method used in the character recognition processing can be various existing methods. For example, the character recognition processing section 193 extracts, from the decolorized image, an image area which is considered, according to a predetermined standard, to be characters. Moreover, the character recognition processing section 193 recognizes characters by collating the extracted image area with the characteristic data stored in the storage section 180.

Figure 6:
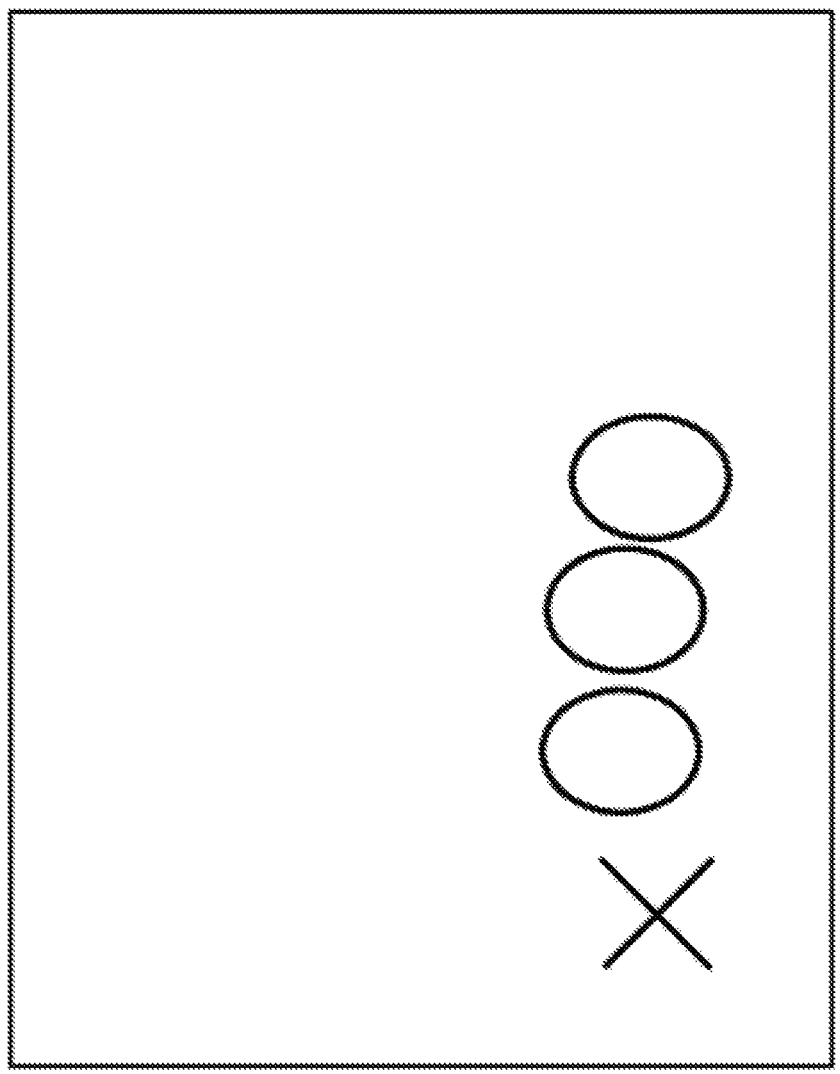
FIG. 6 exemplifies an image for synthesis.

Next, the image synthesis section 194 generates an image for synthesis according to the text data obtained in Act 104 (Act 105). For example, the image synthesis section 194 collates the text data obtained in Act 104 with the answer data pre-stored in the storage section 180. Then, the image synthesis section 194 assigns the image of a circle to text data identical to the answer data and the image of a cross mark to text data different from the answer data. Moreover, the image synthesis section 194 places the assigned images to the position where text data exists. FIG. 6 shows an image for synthesis generated according to the decolorized image shown in FIG. 5.

Then, the image synthesis section 194 generates a synthesized image by carrying out a synthesis processing. Specifically, the image synthesis section 194 synthesizes the non-decolorized image acquired in Act 101 and the image for synthesis obtained in Act 105 (Act 106). FIG. 7 shows an image obtained by synthesizing the non-decolorized image shown in FIG. 3 and the image for synthesis shown in FIG. 6.

Next, the printing control section 195 controls the printing section 150 to print the synthesized image obtained in Act 106 (Act 107). The printing may be permanent printing or decolorable printing. The control section 190 ends the character recognition processing after the printing is completed.

According to the present embodiment, the character recognition apparatus 100 carries out a decolorization processing for a sheet before carrying out a character recognition processing for the sheet, thus improving the accuracy of character recognition.

For example, it is assumed that the character recognition processing section 193 carries out a character recognition processing for the non-decolorized image shown in FIG. 3 as it is. In the non-decolorized image shown in FIG. 3, the character '2' contained in the answer '1230' to the problem 1 is overlapped with a ruled line of an answer box. Thus, it is difficult to determine the character of '2' is '2' or '7'. Further, in the non-decolorized image shown in FIG. 3, the character '7' contained in the answer '17' to the problem 3 is overlapped with a ruled line of an answer box. Thus, it is difficult to determine the character of '7' is '7' or '1'. If the character recognition processing section 193 carries out a character recognition processing for the non-decolorized image shown in FIG. 3 as it is, then the character recognition processing section 193 may wrongly determine the answers to the problems 1 and 3.

However, as the character recognition apparatus 100 of the present embodiment carries out a decolorization processing before carrying out a character recognition processing, the image for which a character recognition processing needs to be carried out becomes the image shown in FIG. 5 for which a character recognition processing can be carried out easily, thus improving the accuracy of the character recognition of the character recognition apparatus 100.

Further, as the part, such as the problem statements, the characters in which do not need to be recognized is erased before the execution of a character recognition processing, the character recognition apparatus 100 only carries out a character recognition processing for the text data needed indeed. As a result, the needed text data is not hidden in unneeded text data.

Embodiment 2

In some cases, an image is printed on a particular sheet. If the particular sheet is a color sheet or a sheet on which a background image is formed in advance, then the accuracy of the character recognition of the character recognition apparatus 100 is lowered. In the embodiment 2, even if the image to be recognized is an image formed on a particular sheet, the character recognition apparatus 100 can still carryout a high-accuracy character recognition processing. The image recognition apparatus 100 of the embodiment 2 is described below.

Like the embodiment 1, the character recognition apparatus 100 of the embodiment 2 comprises a communication section 110, an operation section 120, a conveyance section 130, an image reading section 140, a printing section 150, a decolorization section 160, an output section 170, a storage section 180 and a control section 190.

FIG. 2 is a functional block diagram illustrating the control section 190. Apart from functioning as the decolorization control section 191, the image reading control section 192, the character recognition processing section 193, the image synthesis section 194 and the printing control section 195, the control section 190 also functions as a dropout processing section 196.

The other components of the character recognition apparatus 100 are identical to those of the embodiment 1.

Next, the operations of the character recognition apparatus 100 with the foregoing structure are described below.

Figure 8:
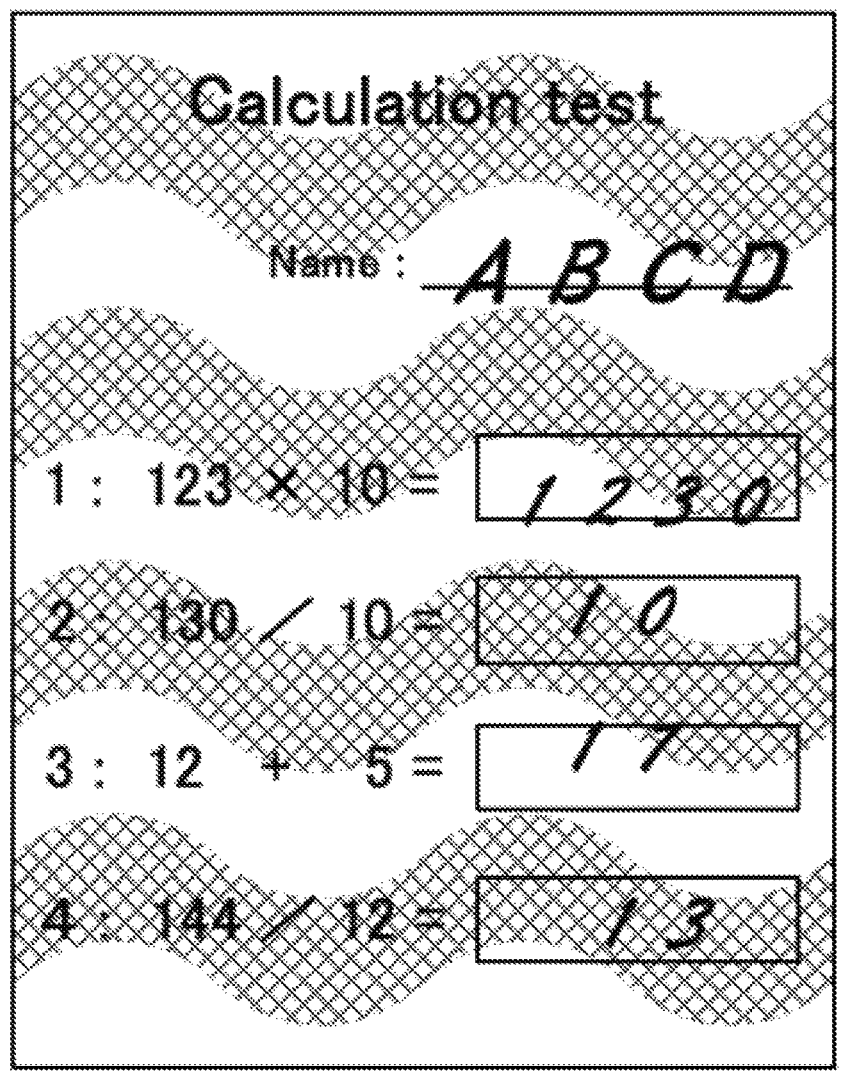
FIG. 8 exemplifies a non-decolorized image.

If an OCR start command is received from the user, the control section 190 starts a character recognition processing. FIG. 8 exemplifies a sheet for which a character recognition processing needs to be carried out. A non-decolorable image (hereinafter referred to as a "background image") is formed on the background of the sheet shown in FIG. 8. The hatched part shown in FIG. 8 is a background image which is different in color or brightness from the characters to be recognized. If the characters to be recognized are black, then the background image is, for example, a colored or gray image. The other parts of the sheet shown in FIG. 8 are identical to that of the image in the embodiment 1 for which a character recognition processing is carried out.

Figure 9:
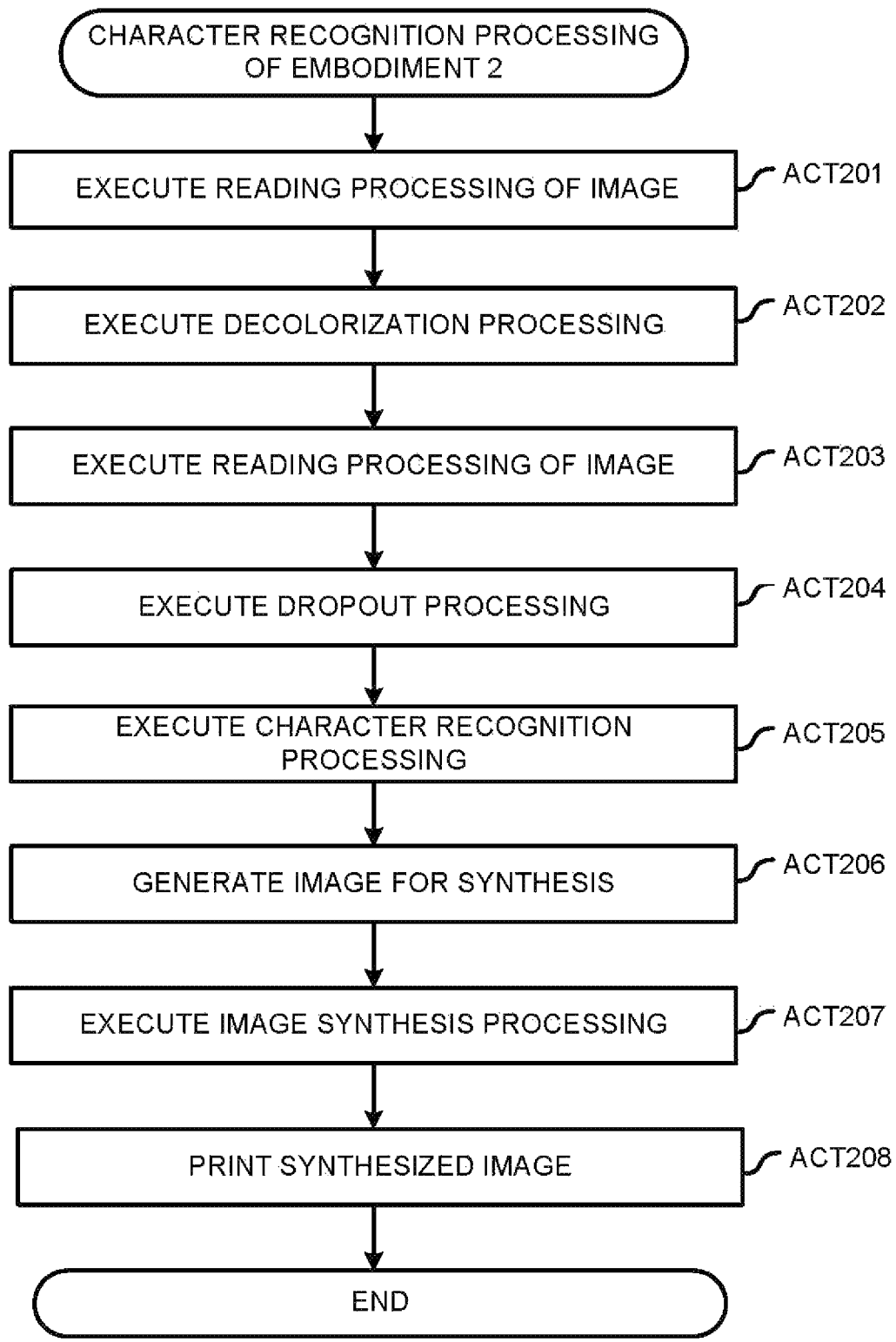
FIG. 9 is a flowchart illustrating a character recognition processing according to embodiment 2.

The character recognition processing is described below with reference to the flowchart of FIG. 9.

The image reading control section 192 conveys a sheet to the image reading section 140. Then, the image reading control section 192 reads an image from the sheet (Act 201).

Then, the decolorization control section 191 conveys the sheet to the decolorization section 160. Sequentially, the decolorization control section 191 carries out a decolorization processing for the sheet (Act 202).

Figure 10:
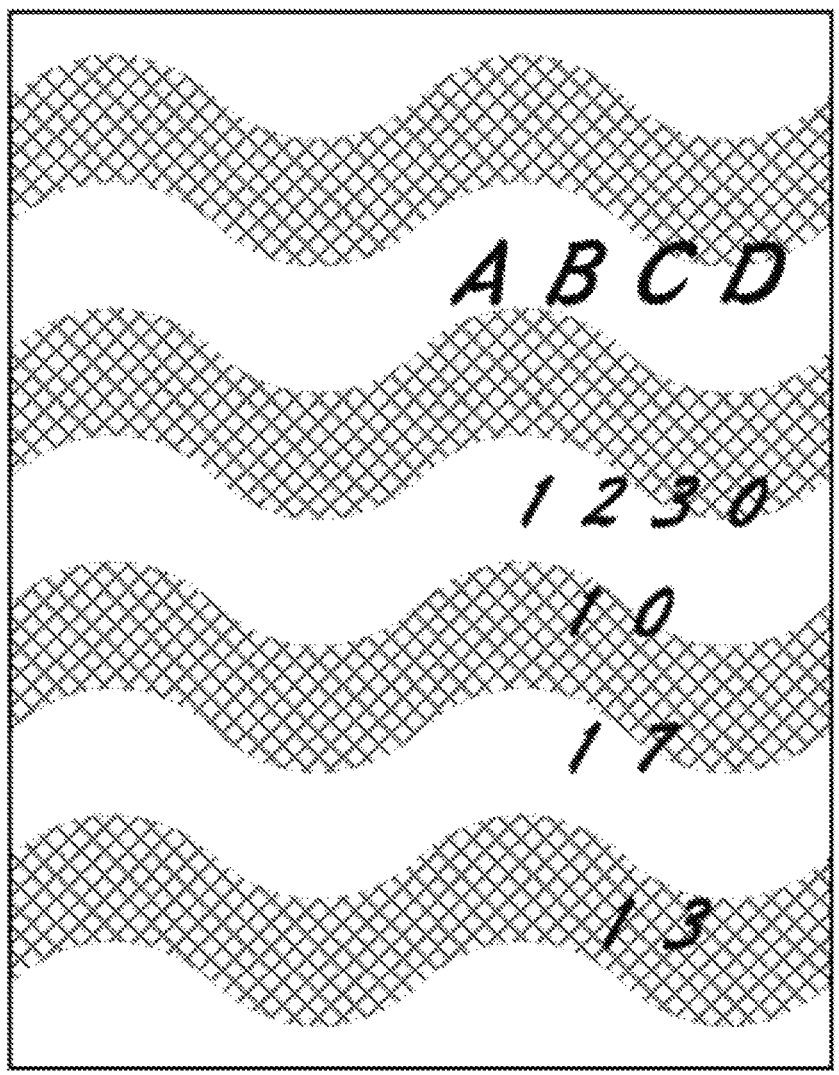
FIG. 10 exemplifies a decolorized image.

Next, the image reading control section 192 conveys the sheet from the decolorization section 160 to the image reading section 140. Then, the image reading control section 192 reads an image from the sheet (Act 203). FIG. 10 exemplifies a decolorized image acquired in Act 203. In FIG. 10, in addition to the name part and the answer parts, the background image is also left but not decolorized.

Return to FIG. 9. The dropout processing section 196 carries out a dropout processing for the decolorized image (Act 204). The dropout processing refers to an image processing of erasing an area having a specific color or a specific brightness from an image. For example, the dropout processing refers to a processing of replacing the pixels in a preset color range with pixels having the same color with the background color (e.g. white) or replacing the pixels in a preset brightness range with pixels having the same color with the background color.

In Act 204, the dropout processing section 196 drops the colors out except for the color (e.g. black) of the characters contained in the name part and the answer parts. The color to be dropped out may be set by the operation section 120. In the case of the image shown in FIG. 10, the background image is erased through a dropout processing to newly generate the image shown in FIG. 5.

Return to FIG. 9. The character recognition processing section 193 carries out a character recognition processing for the generated image obtained in Act 204. Then, the character recognition processing section 193 stores the recognized characters (text data) in the storage section 180 (Act 205).

Next, the image synthesis section 194 generates an image for synthesis according to the text data obtained in Act 205 (Act 206). Moreover, the image synthesis section 194 synthesizes the non-decolorized image acquired in Act 201 and the image for synthesis obtained in Act 206 (Act 207).

Sequentially, the printing control section 195 prints the synthesized image obtained in Act 207 (Act 208). The control section 190 ends the character recognition processing after the printing is completed.

According to the present embodiment, the character recognition apparatus 100 carries out a dropout processing before carrying out a character recognition processing, thus improving the accuracy of character recognition even if the character recognition processing is carried out for an image printed on, for example, a particular sheet.

Figure 11:
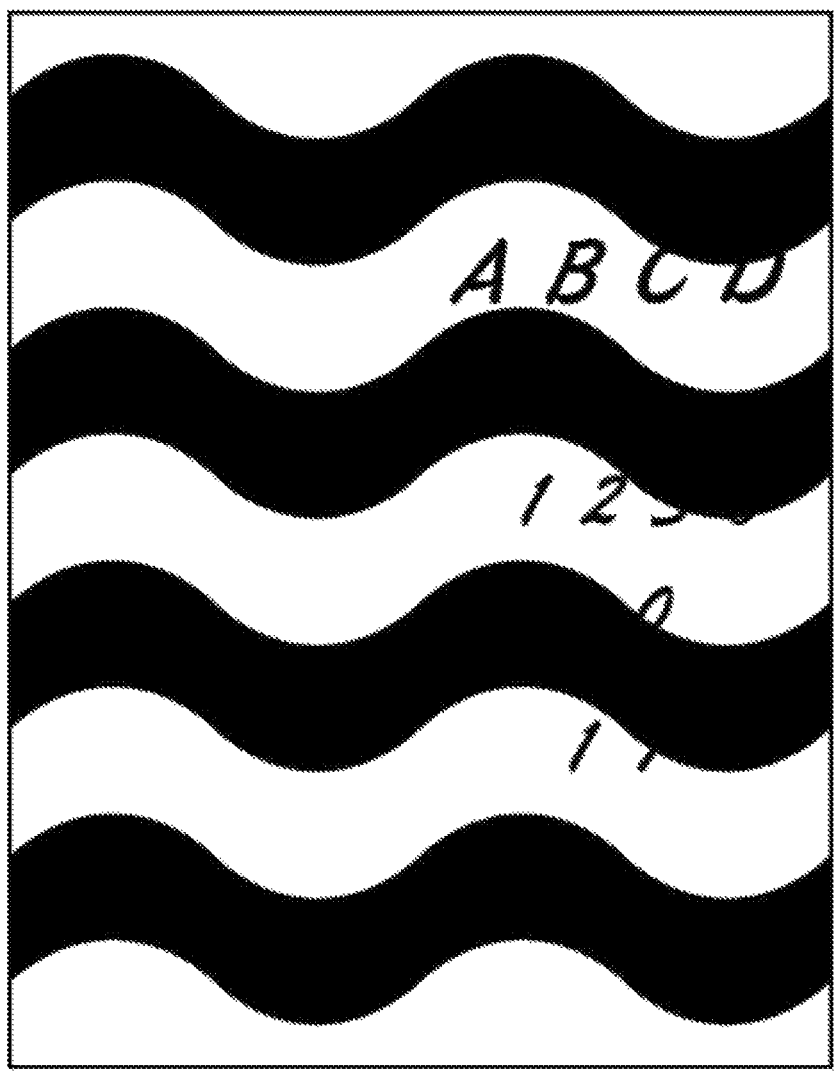
FIG. 11 shows the binarized image of the image shown in FIG. 10.

For example, it is assumed that the character recognition processing section 193 carries out a character recognition processing for the decolorized image shown in FIG. 10 as it is. In most cases, a character recognition processing is carried out for a binarized image. If it is assumed that the character recognition processing section 193 carries out a binarization processing for the decolorized image shown in FIG. 10, then the decolorized image becomes the image shown in FIG. 11 in which text parts and a background image part are integrated. In this case, it is extremely hard to carry out a character recognition processing. However, by erasing the background image through the execution of a dropout processing, the character recognition apparatus 100 can carry out a character recognition processing easily.

Embodiment 3

A pen is started to be used which uses a decolorable ink. It is assumed in embodiment 1 that the italic parts are recorded with a pen using anon-decolorable ink. However, the record of the italic parts with a pen using a decolorable ink should be taken into consideration. If a part for which a character recognition processing needs to be carried out is recorded with a decolorable ink, then in the processing described in the embodiments 1 and 2, the part for which a character recognition processing needs to be carried out is removed as well, as a consequence, the character recognition apparatus 100 cannot carry out a character recognition processing. In the embodiment 3, a character recognition processing can be carried out for a part for which a character recognition processing needs to be carried out even if the part is recorded with a decolorable ink. Next, the character recognition apparatus 100 of the embodiment 3 is described below.

Like the embodiment 1, the character recognition apparatus 100 of the embodiment 3 comprises a communication section 110, an operation section 120, a conveyance section 130, an image reading section 140, a printing section 150, a decolorization section 160, an output section 170, a storage section 180 and a control section 190.

Figure 13:
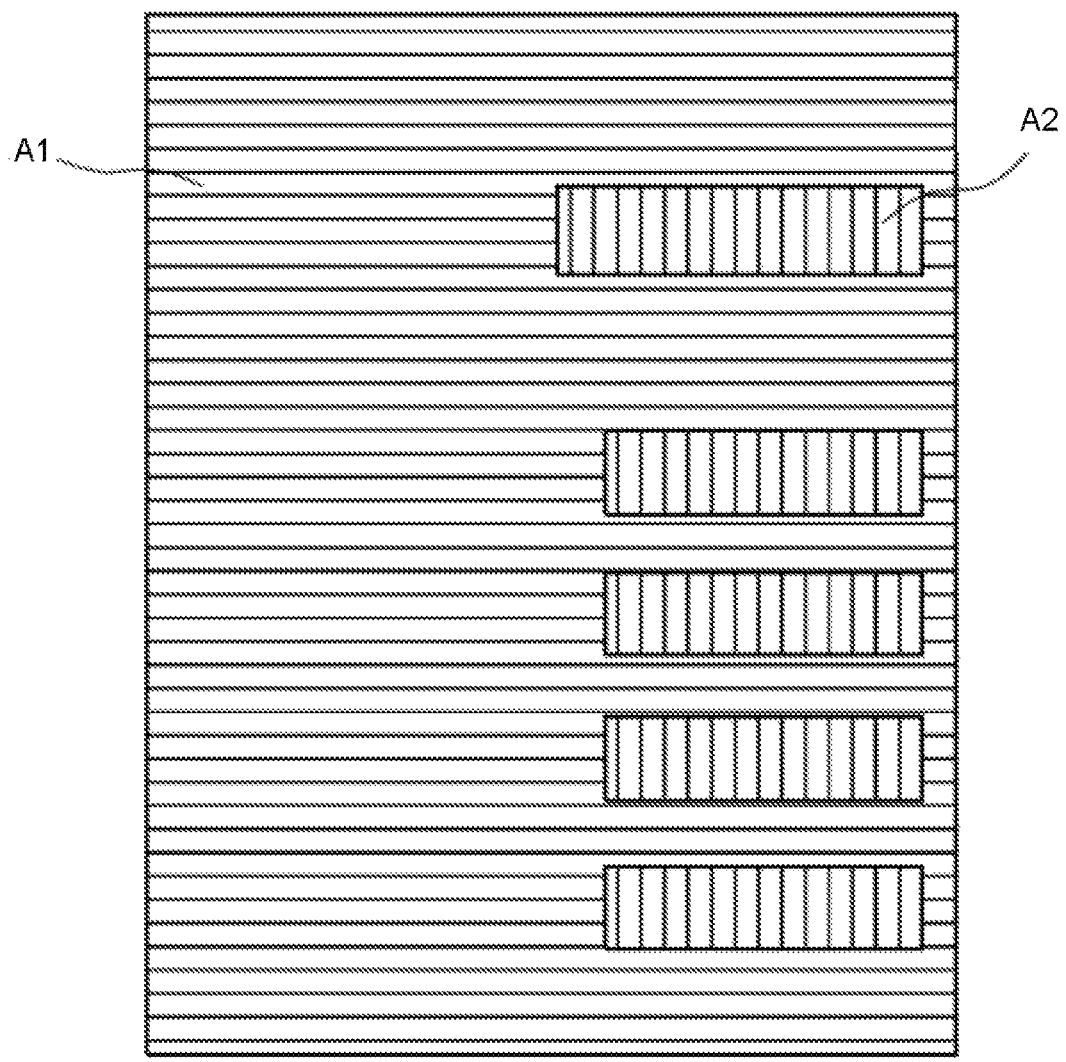
FIG. 13 is a diagram illustrating area information.

Area information for determining an area A1 to be decolorized prior to a character recognition processing and an area A2 to be decolorized after a character recognition processing is stored in the storage section 180. The area information is, for example, the coordinates of the four corners of an area. If it is assumed that the image for which a character recognition processing needs to be carried out is the image shown in FIG. 12, then the area A1 refers to, for example, the area of the horizontal strips shown in FIG. 13, and the area A2 refers to, for example, the area of the vertical strips shown in FIG. 13.

The other components of the character recognition apparatus 100 are identical to those of the embodiment 1.

Next, the operations of the character recognition apparatus 100 with the foregoing structure are described below.

If an OCR start command is received from the operation section 120, the control section 190 starts a character recognition processing. FIG. 12 exemplifies a sheet for which a character recognition processing needs to be carried out. The sheet shown in FIG. 12 is different from that shown in FIG. 3 in that all answers are contained in frames. Further, on the sheet shown in FIG. 12, in addition to a preprinted part, the italic parts are also printed with a decolorable ink. The other part of the sheet shown in FIG. 12 is identical to that of the image (FIG. 3) in the embodiment 1 for which a character recognition processing is carried out.

Figure 14:
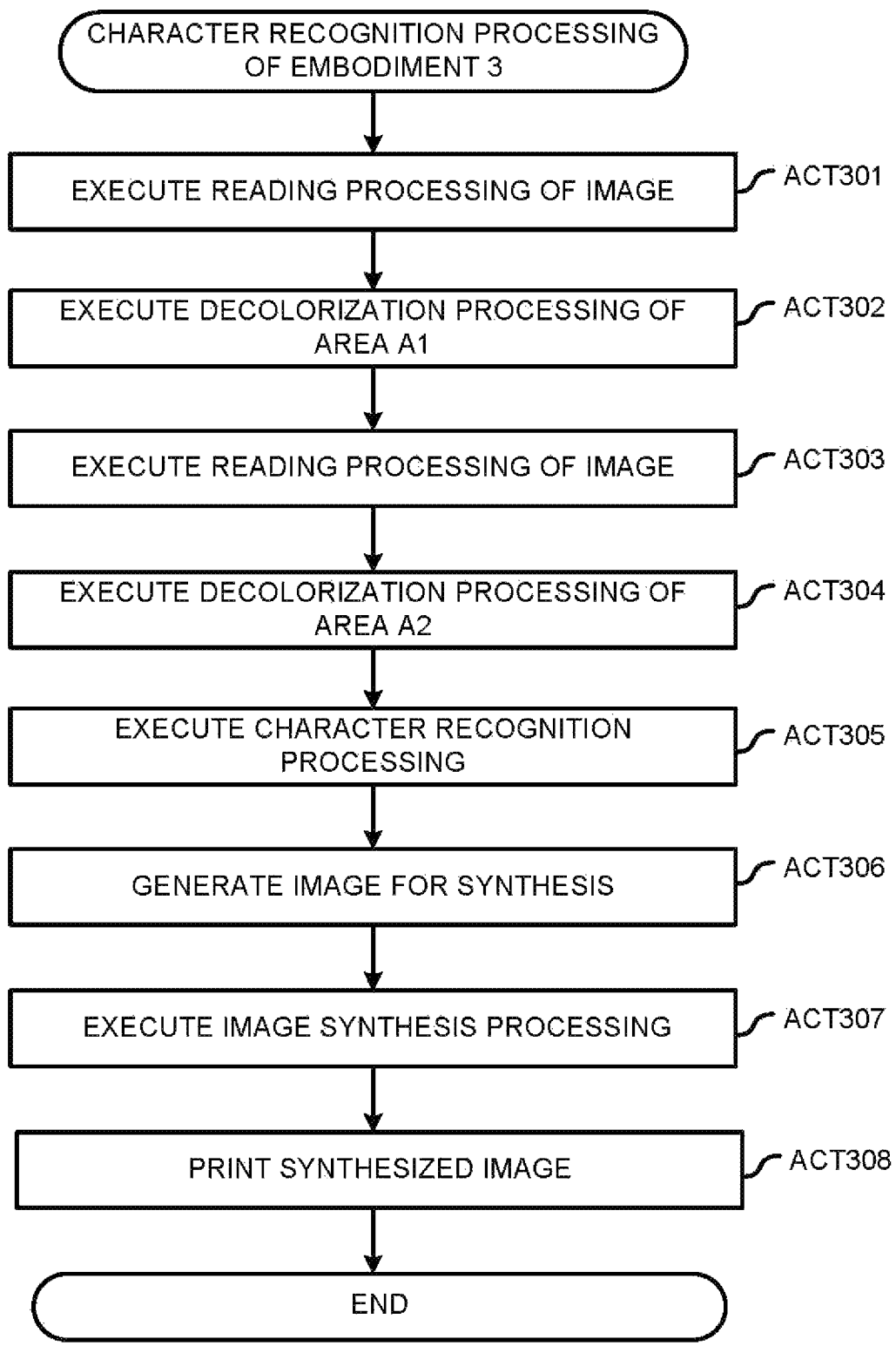
FIG. 14 is a flowchart illustrating a character recognition processing according to embodiment 3.

The character recognition processing is described below with reference to the flowchart of FIG. 14.

The image reading control section 192 conveys a sheet to the image reading section 140. Then, the image reading control section 192 reads an image from the sheet (Act 301).

Then, the decolorization control section 191 conveys the sheet to the decolorization section 160. Sequentially, the decolorization control section 191 carries out a decolorization processing for the area A1 (Act 302).

Next, the image reading control section 192 conveys the sheet from the decolorization section 160 to the image reading section 140. Then, the image reading control section 192 reads an image from the sheet (Act 303). The decolorized image acquired in Act 303 becomes, for example, an image identical to that shown in FIG. 5.

Then, the decolorization control section 191 conveys the sheet to the decolorization section 160. Sequentially, the decolorization control section 191 carries out a decolorization processing for the area A2 (Act 304). At this time, the decolorization control section 191 may carry out a decolorization processing only for the area A2 or for a whole surface of the sheet. If the decolorization processing is at least carried out for the area A2, then the decolorization control section 191 can carry out a decolorization processing for any area.

Sequentially, the character recognition processing section 193 carries out a character recognition processing for the decolorized image acquired in Act 303. Moreover, the character recognition processing section 193 stores the recognized characters (text data) in the storage section 180 (Act 305).

Next, the image synthesis section 194 generates an image for synthesis according to the text data obtained in Act 305 (Act 306). The image synthesis section 194 synthesizes the non-decolorized image acquired in Act 301 and the image for synthesis obtained in Act 306 (Act 307).

Next, the printing control section 195 prints the synthesized image obtained in Act 307 (Act 308). The control section 190 ends the character recognition processing after the printing is completed.

According to the present embodiment, before carrying out a character recognition processing, the character recognition apparatus 100 carries out no decolorization processing for the area A2 for which a character recognition processing needs to be carried out. Thus, even if the characters to be recognized are recorded with a decolorable ink, the character recognition apparatus 100 can still carry out a character recognition processing. Moreover, the area A1 is decolorized for which no character recognition processing needs to be carried out. As unneeded characters are not contained in the decolorized image, the accuracy of the character recognition of the character recognition apparatus 100 is high.

Further, the decolorization control section 191 at least carries out a decolorization processing for the area A2 after the decolorized image is acquired by the image reading control section 192. In this way, a whole surface of the sheet is decolorized for the reuse of the sheet.

Embodiment 4

Figure 15:
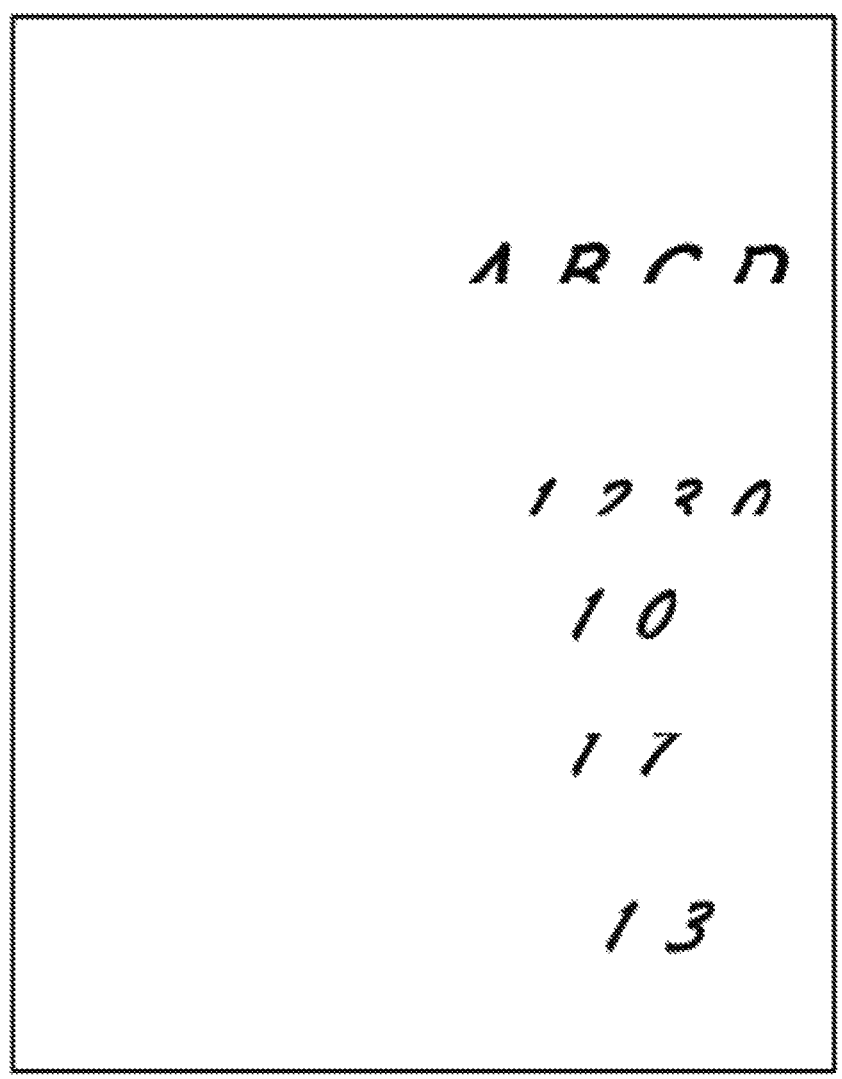
FIG. 15 shows an image in which answers are partially decolorized.

In the embodiment 3, all answers are contained in frames on a sheet. However, the answers may not be contained in the frames. For example, if answers extend out of the boxes, as shown in FIG. 3, then the decolorized image becomes the image shown in FIG. 15 in which answers are partially decolorized. In this case, as the characters to be recognized are partially decolorized, the character recognition apparatus 100 cannot carry out a character recognition processing. In the embodiment 4, a character recognition processing can be carried out even if answers extend out of the frames. Next, the character recognition apparatus 100 of the embodiment 4 is described below.

Like the embodiment 1, the character recognition apparatus 100 of the embodiment 4 comprises a communication section 110, an operation section 120, a conveyance section 130, an image reading section 140, a printing section 150, a decolorization section 160, an output section 170, a storage section 180 and a control section 190.

The decolorization section 160 can carry out a decolorization processing at different decolorization temperatures. For example, the decolorization section 160 can carry out a decolorization processing at a decolorization temperature T1 and a decolorization temperature T2 higher than the decolorization temperature T1.

The other components of the character recognition apparatus 100 are identical to those of the embodiment 1.

Next, the operations of the character recognition apparatus 100 with the foregoing structure are described below.

If an OCR start command is received from the user, the control section 190 starts a character recognition processing. The sheet for which a character recognition processing needs to be carried out is identical in appearance to the sheet shown in FIG. 3. However, on the sheet of the embodiment 4, in addition to a preprinted part, italic parts are also printed with a decolorable ink. The preprinted part can be decolorized at the decolorization temperature T1, and the italic parts can be decolorized at the decolorization temperature T2.

Figure 16:
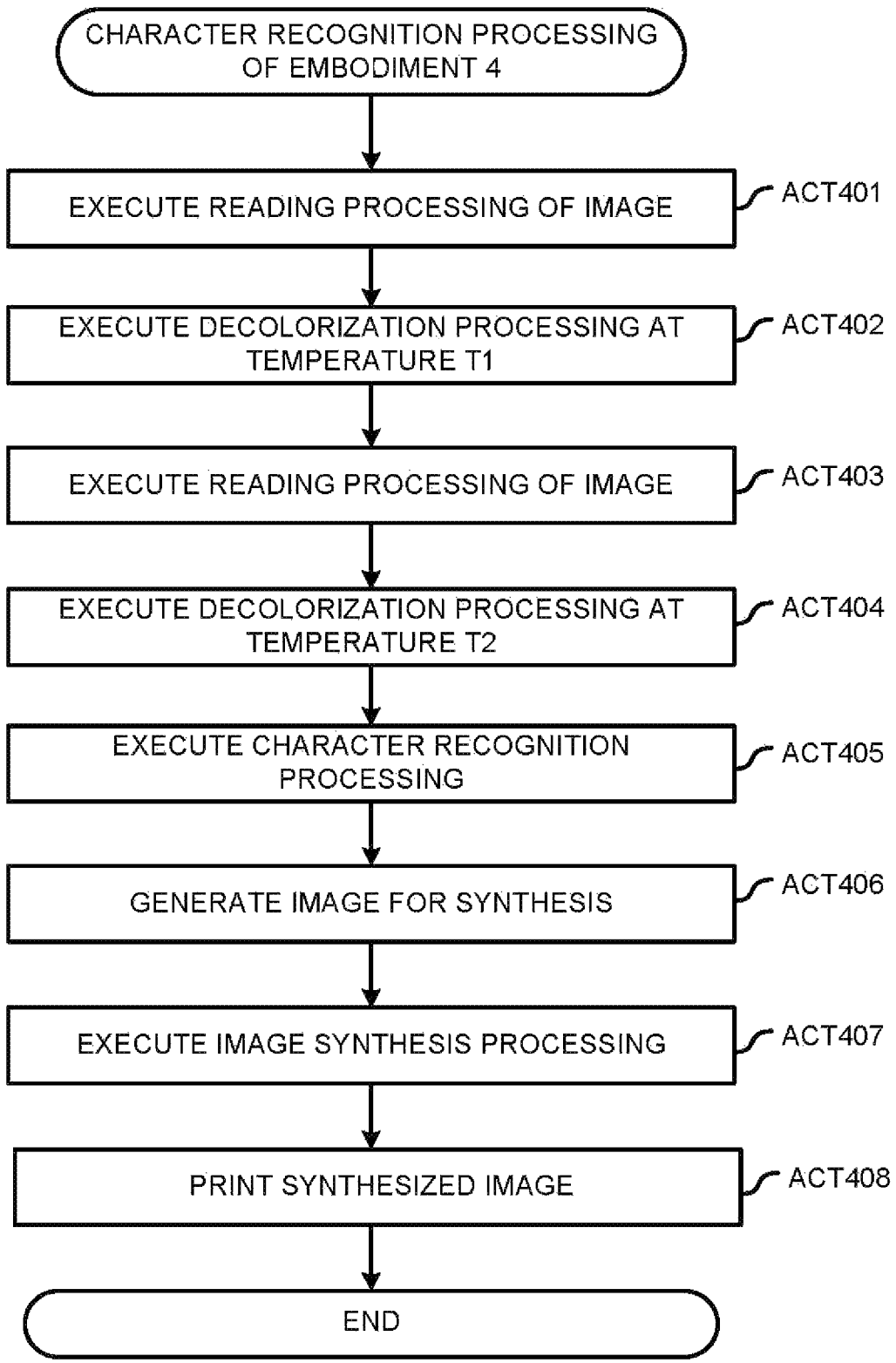
FIG. 16 is a flowchart illustrating a character recognition processing according to embodiment 4.

The character recognition processing is described below with reference to the flowchart of FIG. 16.

The image reading control section 192 conveys a sheet to the image reading section 140. Then, the image reading control section 192 reads an image from the sheet (Act 401).

Then, the decolorization control section 191 conveys the sheet to the decolorization section 160. Sequentially, the decolorization control section 191 carries out a decolorization processing for the sheet at the decolorization temperature T1 (Act 402). At this time, the decolorization control section 191 carries out the decolorization processing for a whole surface of the sheet but not some area of the sheet.

Next, the image reading control section 192 conveys the sheet from the decolorization section 160 to the image reading section 140. Then, the image reading control section 192 reads an image from the sheet (Act 403).

Then, the decolorization control section 191 conveys the sheet to the decolorization section 160. Sequentially, the decolorization control section 191 carries out a decolorization processing for the sheet S at the decolorization temperature T2 (Act 404). At this time, the decolorization control section 191 carries out the decolorization processing for a whole surface of the sheet but not some area of the sheet.

Sequentially, the character recognition processing section 193 carries out a character recognition processing for the decolorized image acquired in Act 403. The character recognition processing section 193 stores the recognized characters (text data) in the storage section 180 (Act 405).

Next, the image synthesis section 194 generates an image for synthesis according to the text data obtained in Act 405 (Act 406). Moreover, the image synthesis section 194 synthesizes the non-decolorized image acquired in Act 401 and the image for synthesis obtained in Act 406 (Act 407).

Next, the printing control section 195 prints the synthesized image obtained in Act 407 (Act 408). The control section 190 ends the character recognition processing after the printing is completed.

According to the present embodiment, the character recognition apparatus 100 carries out a decolorization processing at the decolorization temperature T1 before carrying out a character recognition processing. As the characters to be recognized are not decolorized at the decolorization temperature T1, the character recognition apparatus 100 can carry out a character recognition processing. Moreover, the preprinted part for which no character recognition processing needs to be carried out is decolorized at the decolorization temperature T1. As unneeded characters are not contained in the decolorized image, the character recognition accuracy of the character recognition apparatus 100 is high.

Further, the decolorization control section 191 carries out a decolorization processing at the decolorization temperature T2 after the decolorized image is acquired by the image reading control section 192. In this way, a whole surface of the sheet is decolorized for the reuse of the sheet.

Embodiment 5

In the general, the decolorization temperature of the decolorable ink used by a decolorable penis lower than that of a decolorable toner. If the italic parts are recorded with an ink whose decolorization temperature is low, then in the processing of the embodiment 4, the italic parts are decolorized first. In this case, the characters to be recognized are decolorized to be non-existent, and thus the character recognition apparatus 100 cannot carry out a character recognition processing for the parts for which a character recognition processing needs to be carried out. In the embodiment 5, a character recognition processing can be carried out for a part for which a character recognition processing needs to be carried out even if the part is recorded with an ink having a low decolorization temperature. Next, the character recognition apparatus 100 of the embodiment 5 is described below.

Like the embodiment 1, the character recognition apparatus 100 of the embodiment 5 comprises a communication section 110, an operation section 120, a conveyance section 130, an image reading section 140, a printing section 150, a decolorization section 160, an output section 170, a storage section 180 and a control section 190.

FIG. 2 is a functional block diagram of the control section 190. Apart from functioning as the decolorization control section 191, the image reading control section 192, the character recognition processing section 193, the image synthesis section 194, the printing control section 195 and the dropout processing section 196, the control section 190 also functions as a difference extraction section 197.

The decolorization section 160 can carry out a decolorization processing at different decolorization temperatures. For example, the decolorization section 160 can carry out a decolorization processing at a decolorization temperature T1 and a decolorization temperature T2 higher than the decolorization temperature T1.

The other components of the character recognition apparatus 100 are identical to those of the embodiment 1.

Next, the operations of the character recognition apparatus 100 with the foregoing structure are described below.

If an OCR start command is received from the user, the control section 190 starts a character recognition processing. The sheet for which a character recognition processing needs to be carried out is identical in appearance to the sheet shown in FIG. 3 but different in that the italic parts are also recorded with a decolorable ink. The italic parts can be decolorized at the decolorization temperature T1, and the preprinted part can be decolorized at the decolorization temperature T2.

Figure 17:
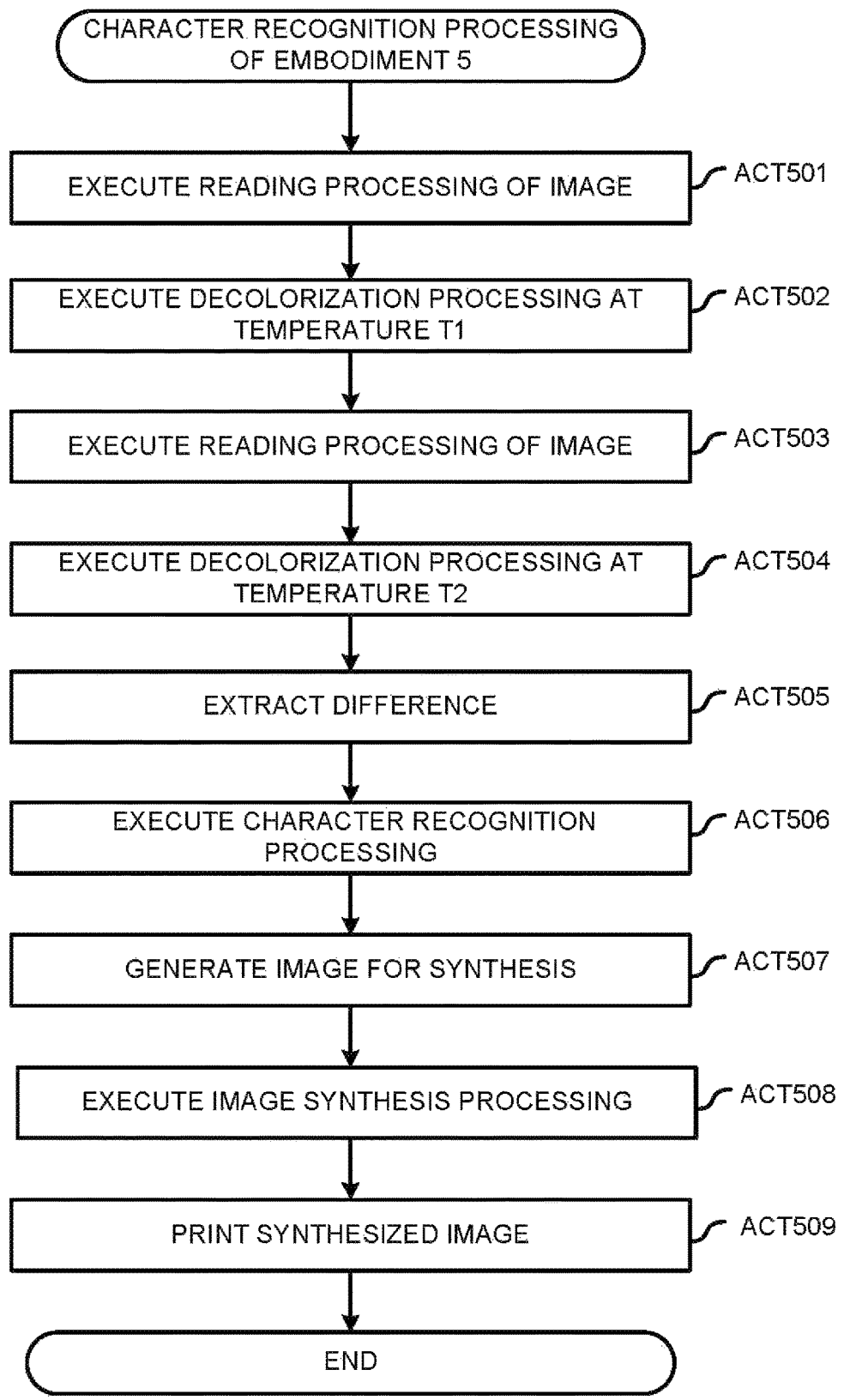
FIG. 17 is a flowchart illustrating a character recognition processing according to embodiment 5.

The character recognition processing is described below with reference to the flowchart of FIG. 17.

The image reading control section 192 conveys a sheet to the image reading section 140. Then, the image reading control section 192 reads an image from the sheet (Act 501).

Then, the decolorization control section 191 conveys the sheet to the decolorization section 160. Sequentially, the decolorization control section 191 carries out a decolorization processing for the sheet at the decolorization temperature T1 (Act 502). At this time, the decolorization control section 191 carries out the decolorization processing for a whole surface of the sheet but not some area of the sheet.

Next, the image reading control section 192 conveys the sheet from the decolorization section 160 to the image reading section 140. Then, the image reading control section 192 reads an image from the sheet (Act 503). FIG. 18 exemplifies a decolorized image acquired in Act 503.

Then, the decolorization control section 191 conveys the sheet to the decolorization section 160. Sequentially, the decolorization control section 191 carries out a decolorization processing for the sheet at the decolorization temperature T2 (Act 504). At this time, the decolorization control section 191 carries out the decolorization processing for a whole surface of the sheet but not some area of the sheet.

Moreover, the difference extraction section 197 extracts the difference between the non-decolorized image acquired in Act 501 and the decolorized image obtained in Act 503. The difference extraction section 197 acquires an image (a difference image) regenerated according to the difference (Act 505). If the non-decolorized image is the image shown in FIG. 3 and the decolorized image is the image shown in FIG. 18, then the difference image is the image shown in FIG. 5.

Sequentially, the character recognition processing section 193 carries out a character recognition processing for the generated image (difference image) obtained in Act 505. The character recognition processing section 193 stores the recognized characters (text data) in the storage section 180 (Act 506).

Next, the image synthesis section 194 generates an image for synthesis according to the text data obtained in Act 506 (Act 507). Moreover, the image synthesis section 194 synthesizes the non-decolorized image acquired in Act 501 and the image for synthesis obtained in Act 507 (Act 508).

Next, the printing control section 195 prints the synthesized image obtained in Act 508 (Act 509). The control section 190 ends the character recognition processing after the printing is completed.

According to the present embodiment, the character recognition apparatus 100 takes a difference image as an image for which a character recognition processing needs to be carried out. Therefore, even if the characters to be recognized can be erased at the decolorization temperature T1, the character recognition apparatus 100 can still carry out a character recognition processing. Moreover, as the preprinted part for which no character recognition processing is to be carried out is not displayed in the difference image, the accuracy of the character recognition of the character recognition apparatus 100 is high.

Further, the decolorization control section 191 carries out a decolorization processing at the decolorization temperature T2 after the decolorized image is acquired by the image reading control section 192. In this way, a whole surface of the sheet is decolorized for the reuse of the sheet.

The foregoing embodiments are merely exemplary, and a variety of variations and applications can be devised.

For example, it is assumed in the embodiments 1-5 that the sheet for which the character recognition apparatus 100 carries out a character recognition processing is a text paper. However, the sheet for which the character recognition apparatus 100 carries out a character recognition processing is not limited to a text paper. For example, the sheet for which the character recognition apparatus 100 carries out a character recognition processing may also be a business form on which an amount and a commodity name are recorded with a decolorable ink.

Further, it is assumed in the embodiments 1 and 2 that the non-decolorable image (preprinted part) on a sheet is an image formed using a ball-point pen or pencil; however, the non-decolorable image may also be a permanently printed image. It is assumed in the embodiments 3-5 that the decolorable image (italic parts) on a sheet is an image formed using a decolorable pen; however, the decolorable image may also be an image printed in a decolorable manner.

Further, the sheet for which a character recognition processing is carried out in the embodiments 1-5 may be a sheet printed by the printing section (the decolorable printing section 151 and the permanent printing section 152) of the character recognition apparatus 100. The decolorable printing section 151 may print with an ink which can be decolorized at the decolorization temperature T1 or with an ink which can be decolorized at the decolorization temperature T2. Apparently, the decolorable printing section 151 may print with both of an ink which can be decolorized at the decolorization temperature T1 and an ink which can be decolorized at the decolorization temperature T2.

Further, it is described in the embodiments 1-5 that the printing section 150 is an electrophotographic type printing device; however, the printing section 150 may also be an inkjet system printing unit.

Further, in the embodiments 3 and 4, the character recognition apparatus 100 carries out a character recognition processing but not a dropout processing for a decolorized image after carrying out an image reading processing. However, like in the embodiment 2, in the embodiment 3 and embodiment 4, the character recognition apparatuses 100 may carry out a dropout processing for a decolorized image before carrying out a character recognition processing.

Additionally, the character recognition apparatus 100, although described as an MFP in the present invention, may not be provided with the printing section 150.

The control device (e.g. the control section 190) for controlling the character recognition apparatus 100 according to the present embodiments of the present invention may be realized by a dedicated computer system or a normal computer system. For example, the control device may also be formed by storing programs for realizing each function of the control section 190 in a computer-readable recording medium such as an optical disk, a semiconductor memory, a magnetic tape and a flexible disk to distribute it, and installing the programs in a computer to execute it. The control device may be a computer (processor) arranged inside the character recognition apparatus 100 or a computer located outside of the character recognition apparatus 100. Further, the programs may also be stored in a disk device of a server on a network such as an Internet and downloaded into a computer. Further, each of the foregoing functions may also be realized through the cooperation of an OS (Operating system) with applications. In this case, the other part different than the OS is stored in a medium and then issued, the other part different than the OS is stored in a server and then downloaded into a computer.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A character recognition apparatus, comprising:
    a processor that executes instructions stored in a memory to perform the function of:
    a decolorization control section configured to carry out a decolorization processing for a sheet;
    an image reading control section configured to carry out an image reading processing for the sheet to which the decolorization processing is executed; and
    a character recognition processing section configured to carry out a character recognition processing for a decolorized image read through the image reading processing after the decolorization processing is carried out or for a generated image generated according to the decolorized image, the character recognition processing recognizes characters by collating the decolorized image with a characteristic data of characters stored in a storage, wherein the characters comprise text data; and
    an image synthesis section configured to assign a predetermined image to recognized characters according to a result of the character recognition processing, and synthesize the assigned predetermined image on a position where the recognized characters exist.

2. The character recognition apparatus according to claim 1, the processor executes further stored instructions to perform the functions of:
    a dropout processing section configured to carry out a dropout processing for the decolorized image, wherein the character recognition processing section carries out the character recognition processing for the generated image resulting from the dropout processing.

3. The character recognition apparatus according to claim 1, wherein
    the decolorization control section carries out the decolorization processing in a preset range of the sheet before the image reading control section carries out the image reading processing for the sheet; and
    the decolorization control section carries out the decolorization processing at least in a remaining range of the sheet after the image reading control section carries out the image reading processing for the sheet.

4. The character recognition apparatus according to claim 1, wherein
    the decolorization control section carries out the decolorization processing for the sheet at a preset first decolorization temperature before the image reading control section carries out the image reading processing for the sheet; and
    the decolorization control section carries out the decolorization processing for the sheet at a second decolorization temperature higher than the first decolorization temperature after the image reading control section carries out the image reading processing for the sheet.

5. The character recognition apparatus according to claim 1, wherein
    before the decolorization control section carries out the decolorization processing for the sheet, the image reading control section carries out the image reading processing for the sheet to acquire a read image as a non-decolorized image.

6. The character recognition apparatus according to claim 5, the processor executes further stored instructions to perform the functions of:
    a difference extraction section configured to extract a difference of two images, wherein
    the decolorization control section carries out the decolorization processing for the sheet at a preset first decolorization temperature after the image reading control section acquires the non-decolorized image;

after the decolorization control section carries out the decolorization processing at the preset first decolorization temperature, the image reading control section carries out the image reading processing for the sheet to acquire a read image as a decolorized image;

the difference extraction section extracts the difference between the non-decolorized image and the decolorized image and acquires an image formed by the difference as the generated image; and the character recognition processing section carries out the character recognition processing for the generated image acquired by the difference extraction section.

7. The character recognition apparatus according to claim 6, wherein the decolorization control section carries out the decolorization processing for the sheet at a second decolorization temperature higher than the preset first decolorization temperature after the image reading control section acquires the decolorized image.

8. The character recognition apparatus according to claim 5, wherein the image synthesis section synthesizes an image for the non-decolorized image according to the result of the character recognition processing.

9. The character recognition apparatus according to claim 8, the processor executes further stored instructions to perform the functions of:

a printing control section configured to print the image synthesized by the image synthesis section.

10. A character recognition method, comprising:

carrying out a decolorization processing for a sheet;

carrying out an image reading processing for the sheet to which the decolorization processing is carried out;

carrying out a character recognition processing to recognize characters for a decolorized image read through the image reading processing after the decolorization processing is carried out or for a generated image generated according to the decolorized image, the character recognition processing recognizes characters by collating the decolorized image with a characteristic data of characters stored in storage, wherein the characters comprise text data; and assigning a predetermined image to recognized characters according to a result of the character recognition processing and synthesizing the assigned predetermined image on a position where the recognized characters exist.

* * * * *